April 9, 1957

A. R. CHASAR 2,788,216

CHUCK JAW WITH SELF-TIGHTENING WORK GRIPPING HEAD

Filed Oct. 28, 1955

INVENTOR
*Anthony R. Chasar*

BY *McCoy, Greene r/e Grotenhuis*
ATTORNEYS

United States Patent Office 2,788,216
Patented Apr. 9, 1957

2,788,216

CHUCK JAW WITH SELF-TIGHTENING WORK GRIPPING HEAD

Anthony R. Chasar, Cleveland, Ohio, assignor to The Oster Manufacturing Company, Cleveland, Ohio, a corporation of Ohio Application October 28, 1955, Serial No. 543,394

5 Claims. (Cl. 279—123)

This invention relates to chucks and more particularly to a chuck jaw provided with a work gripping head which rocks to tighten the grip of the jaw on the work when subjected to a torsional thrust in either direction.

The chuck jaw of the present invention has a work gripping head that is mounted on a jaw body to rock in either direction from a normal position in which its work engaging face is disposed tangentially with respect to a work piece engaged by the jaw. The rocking movement of the work gripping head is effected by torsional thrusts exerted thereon by the work piece and such rocking movements serve to increase the gripping pressure exerted on the work so as to effectively resist relative turning movements of the work with respect to the chuck.

In order to provide a pivotal connection between the jaw body and the work gripping head which is substantially frictionless and at all times responsive to torsional thrusts, the jaw body is provided with a V-shaped bearing recess in its end face and the work gripping head has a bearing apex the sides of which are at a sharper angle than the sides of the bearing recess, so that when the head is seated in the recess a knife edge pivot is provided between the jaw body and work gripping head.

In order to retain the head on the jaw body and yieldably resist rocking movements of the head due to torsional thrusts in either direction and to return the head to its normal position when such torsional thrusts are relieved, cushioning means is provided between the head and the jaw body which is preferably in the form of elastic material such as rubber which fills the spaces between the opposite sides of the bearing apex of the work engaging head and the jaw body to yieldably resist rocking movements of the head in either direction, the cushioning rubber being bonded to the head and to the jaw body to hold the head in place on the jaw body.

In order to limit the extent of pivotal movement of the work gripping head and to provide the desired resistance to angular movement of the head with respect to the jaw body, relatively thin wedges of elastic rubber are provided between the slanting sides of the head and the slanting sides of the bearing recess. The narrow wedges of rubber between the sides of the head and the sides of the bearing recess are alternately subjected to pressure and tension and, since rubber is non-compressive, the percentage of stretch under pressure to which these narrow wedges are subjected is relatively high and therefore substantial tensile stresses are set up in the rubber bond and repeated flexures tend to impair the bonds between these wedges of rubber and the head and jaw body.

In order to maintain an effective bond between the rubber and the jaw body and the work gripping head, the head receiving end face of the jaw body is formed to provide additional bonding surfaces between other portions of the rubber and the head and jaw body that are subjected only to relatively low bond stresses due to rocking movements of the head. As herein shown, the end of the chuck jaw is provided with raised end portions in which the V-shaped recesses are quite deep, while the intermediate portions of the end face of the jaw are shaped to provide a transverse depression or channel which accommodates thicker bodies of rubber between the work gripping head and the jaw body, so the bonds between the intermediate portions of the rubber and the intermediate portions of the head and jaw body are not subjected to severe bond stresses and are not deteriorated by repeated pivotal movements of the head.

The invention has for an object to provide a rocking bearing between the jaw body and work gripping head that has no parts in sliding contact, that does not offer resistance to pivotal movement of the head due to clamping pressure, the head being readily movable in response to torsional thrusts and readily returning to its normal position when the torsional thrust is relieved so that only light initial clamping pressure need be applied to the work and the work is easily releasable when the torsional thrust thereon is relieved.

A further object of the invention is to provide a pivotal joint which requires no lubrication, which is shielded against entry of dust and grit and which can not become rusted or frozen in any adjusted position.

Reference should be had to the accompanying drawings forming a part of this specification in which.

Figure 1:
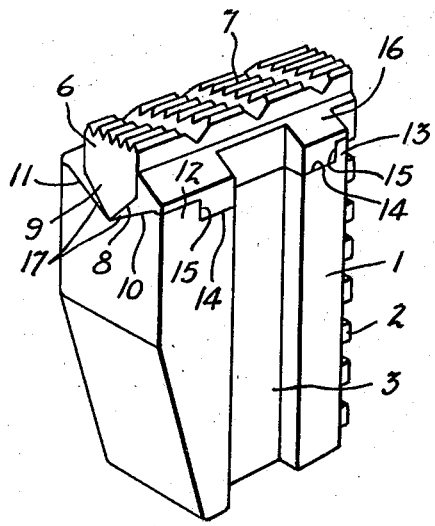
Figure 1 is a perspective view of a chuck jaw embodying the invention.
Figure 2:
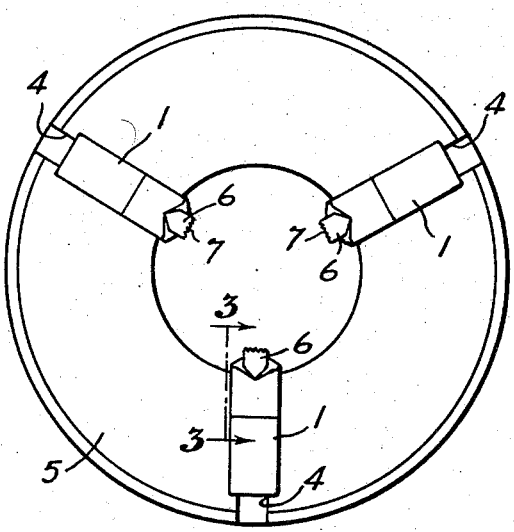
Fig. 2 is a front elevation of a chuck with the jaws of the present invention mounted thereon.
Figure 3:
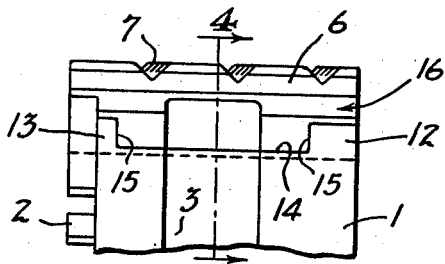
Fig. 3 is a fragmentary side elevation of the work engaging end of the chuck jaw.

Referring to the accompanying drawings, the chuck jaw of the present invention has a body 1 having parallel side faces and a toothed edge 2 for engagement with a scroll wheel or the like for moving the jaw radially in a chuck body. The opposite side faces of the body 1 have longitudinal channels 3 which serve to position the jaw in radial slots 4 in a chuck body 5 as shown in Fig. 2.

A rockable work gripping head 6 is mounted on an end of the body 1 and is provided with a toothed work engaging face 7. The head 6 is also provided with angularly disposed side faces 8 and 9 which intersect along a line parallel to the outer face 7 to provide a knife edge bearing apex which is received in a V-shaped recess in the end face of the body 1 formed by angularly disposed sides 10 and 11 which intersect centrally of said end face. The side faces 8 and 9 of the work engaging head are disposed at a sharper angle than the sides 10 and 11 of the bearing recess so that the work gripping head has a knife edge bearing at the bottom of the V-shaped bearing recess. The end portions 12 and 13 of the head receiving face of the jaw body 1 are raised with respect to intermediate portions of the end face to provide relatively deep bearing recesses in which the ends of the head 6 engage.

Figure 4:
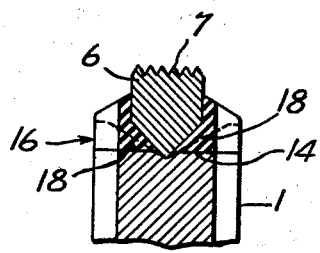
Fig. 4 is a fragmentary section taken on the line indicated at 4—4 in Fig. 3.

Intermediate the raised portions 12 and 13 the end face of the jaw body is formed to provide a transverse depression or channel that extends from one side face of the jaw body to the other, the depression or channel having a bottom 14 and sides 15. Elastic rubber 16 embeds the inner portion of the work gripping head 6 and fills the spaces between the work gripping head and the sides 10 and 11 of the bearing recess and between the sides of the work gripping jaw and the bottom 14 of the transverse channel. The rubber cushioning means has narrow wedge-shaped portions 17 interposed between the faces 8 and 10 and 9 and 11 of the work gripping head and jaw body and thicker portions 18 interposed between the sides of the work gripping heads 6 and the bottom 14 of the recessed central portion of the jaw body, as shown in Fig. 4. The cushioning rubber is molded to conform to the jaw body and is bonded to the sides of the work gripping head 6 and to the face portions 10 and 11 and 14 and 15 of the jaw body with which it contacts.

Figure 5:
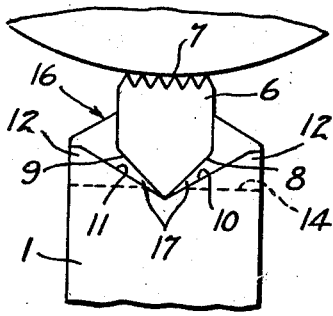
Fig. 5 is a fragmentary side elevation showing a chuck jaw engaging a work piece with the work gripping head in its normal position.
Figure 6:
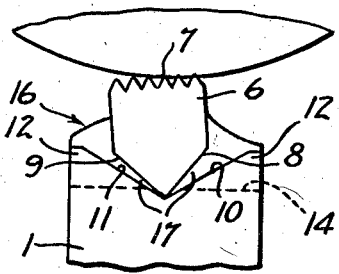
Fig. 6 is a fragmentary side elevation showing the work gripping head rocked to the left by a clockwise torque thrust exerted thereon by the work.

As shown in Figs. 5 and 6, the rocking movements of the work gripping heads 6 may subject the relatively thin wedge-shaped portions 17 to considerable bonding stress. Repeated rocking movements of the work gripping head 6 may tend to impair the bond between the wedge shaped portions 17 of the rubber and the faces 8, 9, 10 and 11, but such impairment does no harm since an additional effective bond is maintained between the thicker intermediate portions 18 of the rubber body and the work gripping head and the faces 14 and 15 of the jaw body.

As herein shown, the depth of the intermediate channel of the jaw body is but slightly less than the depth of the bearing recess and it will be apparent that the bottom 14 could be at the same level or below the bottom of the bearing recess in cases where it is desirable to provide a thicker rubber cushion intermediate the ends of the work gripping head.

It is to be understood that in accordance with the provisions of the patent statutes, variations and modifications of the specific devices herein shown and described may be made without departing from the spirit of the invention.

What I claim is:

1. A chuck jaw comprising a body provided with a V-shaped bearing recess in an end thereof, a work gripping head having a work engaging face at one end and a V-shaped apex at its opposite end with sides disposed at a sharper angle than the sides of said recess engaging in said recess to provide a fulcrum about which it rocks, and means for retaining said head on said body and for yieldably resisting rocking movements thereof.

2. A chuck jaw comprising a body provided with a V-shaped bearing recess in an end thereof, a work gripping head having a V-shaped apex with sides disposed at a sharper angle than the sides of said recess rockably mounted in said recess, and elastic rubber forming a cushion interposed between said head and said body and bonded to said head and to said body.

3. A chuck jaw comprising a body having parallel sides and an elongated end face with projecting end portions provided with alined V-shaped bearing recesses, a work gripping head having a V-shaped apex with sides disposed at a sharper angle than the sides of the V-shaped recesses and rockably engaging the bottoms of said recesses, and elastic rubber forming a cushion yieldably resisting rocking movements of said head interposed between said apex and said head, interposed between the sides of said apex and the sides of said recesses and bonded to the sides of said apex, the sides of said recess and to said body intermediate said projecting end portions.

4. A chuck jaw comprising a body having parallel side faces and an elongated end face provided with portions extending reentrantly from adjacent said opposite side faces and joining adjacent the center line of said end face to provide a bearing recess, other portions of said end face extending from adjacent the line of juncture of said reentrant face portions to said side faces at an angle to said side faces more nearly perpendicular thereto than said reentrant portions, an elongated work gripping head having a longitudinal work engaging face and a longitudinal apex rockably engaging in said bearing recess and having side faces at an angle to one another smaller than the angle between said reentrant face portions, and elastic rubber cushioning means interposed between the sides of said apex and said body and bonded to said head and said body.

5. A chuck jaw comprising a body having parallel side faces and an elongated end face having raised end portions and a transverse channel extending across the same between said end portions, a centrally disposed V-shaped bearing recess disposed longitudinally of said end face and extending through said raised end portions, an elongated work engaging head having a work engaging face and a V-shaped longitudinally extending apex having side faces disposed at a sharper angle than the sides of said recess and rockably engaging in said recess, and elastic rubber forming a cushion yieldably resisting rocking movements of said head, said rubber extending into the spaces between the sides of said apex and the sides of said bearing recess and the bottom of said channel and bonded to said head, to the sides of said bearing recess and and to the sides and bottom of said channel.

References Cited in the file of this patent

UNITED STATES PATENTS

| | | |
|---|---|---|
| 1,918,439 | Warman | July 18, 1933 |
| 2,403,136 | Stoner | July 2, 1946 |